(12) United States Patent
Hochstetler et al.

(10) Patent No.: US 10,738,708 B2
(45) Date of Patent: Aug. 11, 2020

(54) ACCESSORY DRIVE GEAR FOR INTEGRATED DRIVE GENERATOR

(71) Applicant: HAMILTON SUNDSTRAND CORPORATION, Charlotte, NC (US)

(72) Inventors: Derek R. Hochstetler, Rockford, IL (US); Ted A. Martin, Byron, IL (US); Duane C. Johnson, Beloit, WI (US); Glenn C. Lemmers, Loves Park, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 297 days.

(21) Appl. No.: 15/723,469

(22) Filed: Oct. 3, 2017

(65) Prior Publication Data
US 2019/0101058 A1  Apr. 4, 2019

(51) Int. Cl.
| | | |
|---|---|---|
| F16H 55/17 | (2006.01) | |
| F02C 7/32 | (2006.01) | |
| F16H 47/04 | (2006.01) | |
| F16H 3/72 | (2006.01) | |
| F16H 55/08 | (2006.01) | |
| F16H 37/08 | (2006.01) | |

(52) U.S. Cl.
CPC ............. *F02C 7/32* (2013.01); *F16H 3/728* (2013.01); *F16H 37/0806* (2013.01); *F16H 47/04* (2013.01); *F16H 55/0806* (2013.01); *F16H 55/0873* (2013.01); *F16H 55/17* (2013.01); *F05D 2220/76* (2013.01); *F05D 2260/40311* (2013.01); *F16H 2055/0893* (2013.01)

(58) Field of Classification Search
CPC ............. F16H 55/0806; F16H 55/0826; F16H 55/0873; F16H 55/0886; F16H 2055/086; F16H 2055/0866; F16H 2055/0893; F16H 55/17; F02C 7/32
See application file for complete search history.

(56) References Cited

U.S. PATENT DOCUMENTS

| | | | |
|---|---|---|---|
| 2010/0024434 A1 | 2/2010 | Moore et al. | |
| 2010/0327684 A1 | 12/2010 | Grosskopf et al. | |
| 2014/0007741 A1 | 1/2014 | Vanderzyden et al. | |
| 2015/0236565 A1* | 8/2015 | Brust | H02K 7/08 310/90 |
| 2016/0146243 A1* | 5/2016 | Campbell | F04B 1/20 464/179 |

OTHER PUBLICATIONS

European Search Report for EP Application No. 18198115.0 dated Feb. 26, 2019.

* cited by examiner

*Primary Examiner* — Erin D Bishop
(74) *Attorney, Agent, or Firm* — Carlson, Gaskey & Olds, P.C.

(57) ABSTRACT

An accessory drive gear for use in the integrated drive generator includes a gear body extending between a first end and a second end and having a plurality of gear teeth at a radially outer surface adjacent the first end, and the gear teeth having a gear tooth profile, with roll angles A, B, C, and D, and the roll angle at A being between 17.0 and 18.5°, the roll angle at B being between 20.0 and 21.5°, the roll angle at C being between 29.5 and 31.0°, and the roll angle at D being between 32.5 and 34.0°. In addition, an integrated drive generator is disclosed as is a method of replacing an accessory drive gear in an integrated drive generator.

8 Claims, 3 Drawing Sheets

ACCESSORY DRIVE GEAR FOR INTEGRATED DRIVE GENERATOR

BACKGROUND OF THE INVENTION

This application relates to an accessory drive gear for use in an integrated drive generator.

Integrated drive generators are known and often utilized in aircraft. As known, a gas turbine engine on the aircraft provides a drive input into a generator input shaft. The generator typically includes a disconnect shaft that can transmit the input into a gear differential. The gear differential selectively drives a main generator to provide electric power for various uses on the aircraft.

It is desirable that the generated power be of a desired constant frequency. However, the speed from the input shaft will vary during operation of the gas turbine engine. This would result in variable frequency.

Integrated drive generators are provided with speed trimming hydraulic units. Gears associated with the differential and, in particular, a ring gear portion, provide rotation from the differential back into the trimming unit. A carrier also rotates another portion of the trimming unit. The trimming unit is operable to result in the output speed of the differential being effectively constant, such that electric power of a desirable frequency is generated.

The generator is mounted between two housing portions and a seal plate is mounted between the two housing portions.

In addition, various accessory systems, such as various pumps, are driven by the carrier of the differential through an accessory drive gear.

In addition, various accessory systems, such as various pumps, are driven by an input shaft to a carrier of the differential and through an accessory drive gear.

The accessory drive gear must successfully provide rotational input to a pair of driven gears. There are challenges with regard to the accessory drive gear.

SUMMARY OF THE INVENTION

An accessory drive gear for use in the integrated drive generator includes a gear body extending between a first end and a second end and having a plurality of gear teeth at a radially outer surface adjacent the first end, and the gear teeth having a gear tooth profile, with roll angles A, B, C, and D, and the roll angle at A being between 17.0 and 18.5°, the roll angle at B being between 20.0 and 21.5°, the roll angle at C being between 29.5 and 31.0°, and the roll angle at D being between 32.5 and 34.0°.

In addition, an integrated drive generator is disclosed as is a method of replacing an accessory drive gear in an integrated drive generator.

These and other features may be best understood from the following drawings and specification.

DETAILED DESCRIPTION

Figure 1:
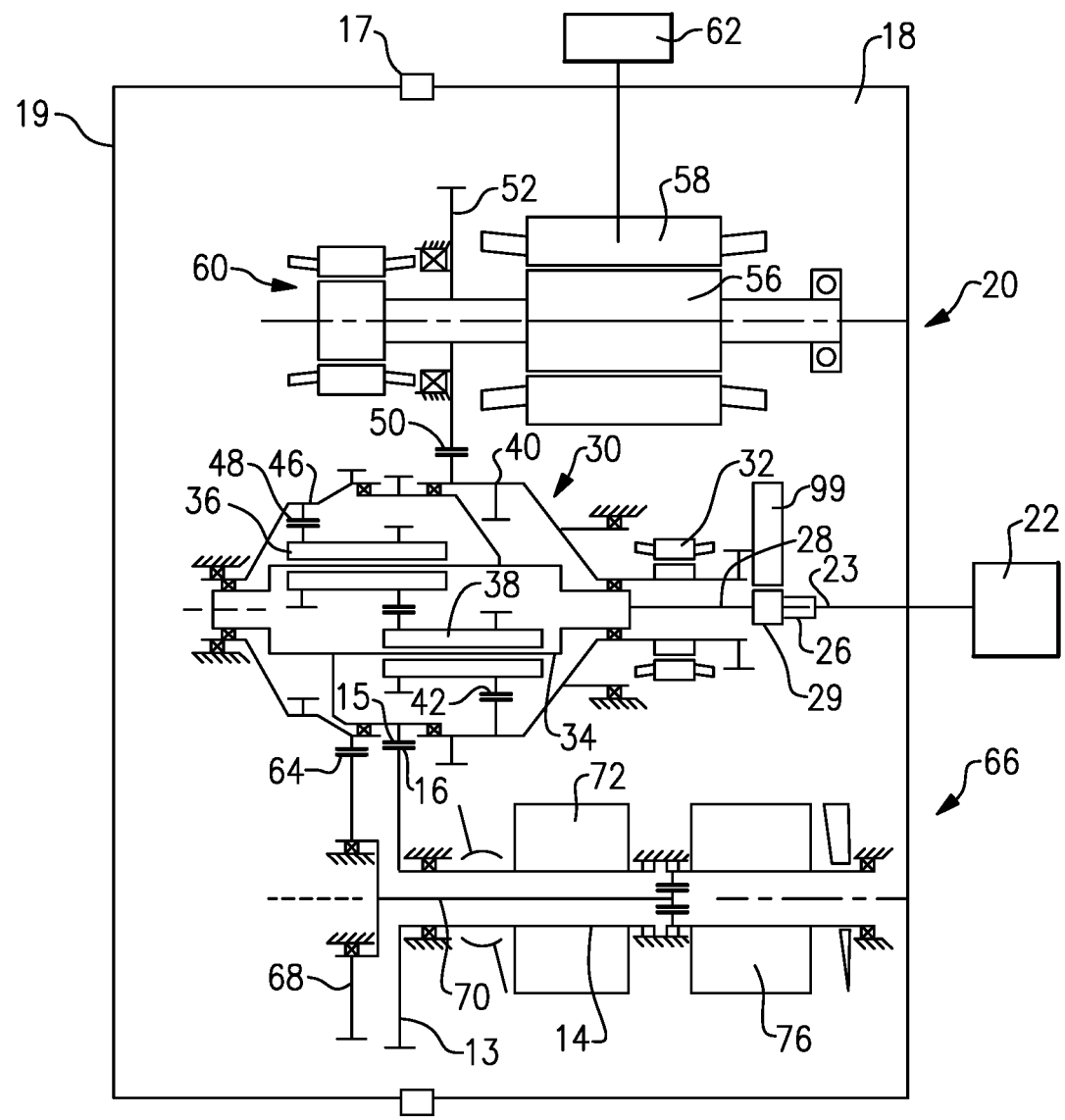
FIG. 1 schematically shows an integrated drive generator.

FIG. 1 shows an integrated drive generator 20. As shown, housing portions 18 and 19 surround the integrated drive generator and a seal plate 17 sits between the housing portions 18 and 19.

A gas turbine engine 22 may drive an input shaft 23 which selectively drives a disconnect assembly 26. The disconnect assembly 26, in turn, drives a carrier shaft 28, which drives a carrier 34 in a gear differential 30.

As the carrier shaft 28 rotates, planet gears 36 and 38 are caused to rotate. Gears 38 have a gear interface 42 with a first ring gear portion 40. Gears 36 have a gear interface 48 with a second ring gear portion 46.

Ring gear portion 40 has a gear interface 50 with a main generator drive gear 52. When drive gear 52 is driven to rotate, it rotates a rotor 56 associated with a stator 58 of the main generator as well as an exciter rotor 60. Electric power is generated for a use 62, as known.

It is desirable that the frequency of the generated electric power be at a desired frequency. This requires the input speed to gear 52 to be relatively constant and at the desired speed. As such, the speed of the input shaft 23 is added to the speed of the speed trimmer 66 to result in a constant input speed to gear 52.

A gear 15 that is part of the carrier has a gear interface 16 with a gear 13 driving a shaft 14 also within the speed trimmer.

As known, the speed trimmer 66 includes a variable unit 72 and a fixed unit 76. The units 72 and 76 may each be provided with a plurality of pistons and a swash plate arrangement. If the input speed of the gear 13 is too high, the speed of the gear 52 will also be too high, and hence, the speed trimmer 66 acts to lower the speed of the trim gear 46 which will drop the speed of gear 52. On the other hand, if the input speed is too low, the speed trimmer will increase the trim gear speed and the speed seen by gear 52 will increase.

In essence, the variable unit 72 receives an input through gear 13 that is proportional to the speed of the input shaft 23. The variable unit 72 also receives a control input from a control monitoring the speed of the generator rotor 56. The position of the swash plate in the variable unit 72 is changed to in turn change the speed and direction of the fixed unit 76. The fixed unit 76 can change the speed, and direction of rotation of the shaft 70, and this then provides control back through the trim ring gear 46 to change the speed reaching the generator. In this manner, the speed trimmer 66 results in the frequency generated by the generator being closer to constant, and at the desired frequency.

A permanent magnet generator 32 rotates with the ring gear 40.

Figure 2:
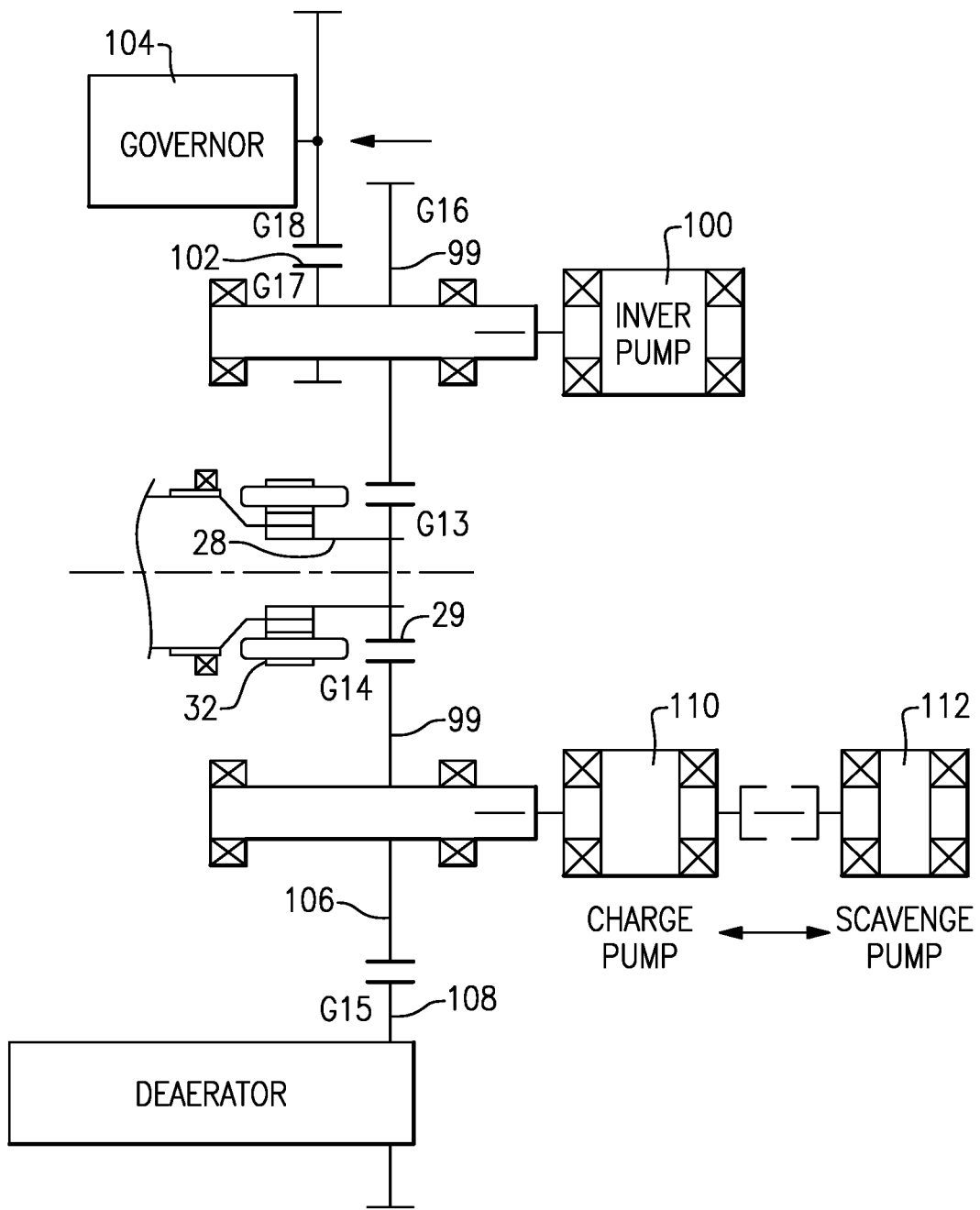
FIG. 2 shows an accessory gear drivetrain.

An accessory drive shaft 29 rotates with the carrier shaft 28 and drives a plurality of accessory gears 99 (shown here as a schematic for simplicity—see FIG. 2 for detail).

The operation of the integrated drive generator 20 is generally as known in the art. A worker of ordinary skill would recognize that the desired frequency and speed at use 62 would dictate a number of design functions. FIG. 2 shows the accessory drive gear 29. The accessory drive gear 29 drives a pair of driven gears 99. These driven gears were shown schematically as gear 99 in FIG. 1. One gear 99 drives a second gear 102 which, in turn, drives a governor 104. The gear 99 also drives an inversion pump 100. Also, the second gear 99 drives a deaerator through gear 108, as well as a charge pump 110 and a scavenge pump 112.

Figure 3A:
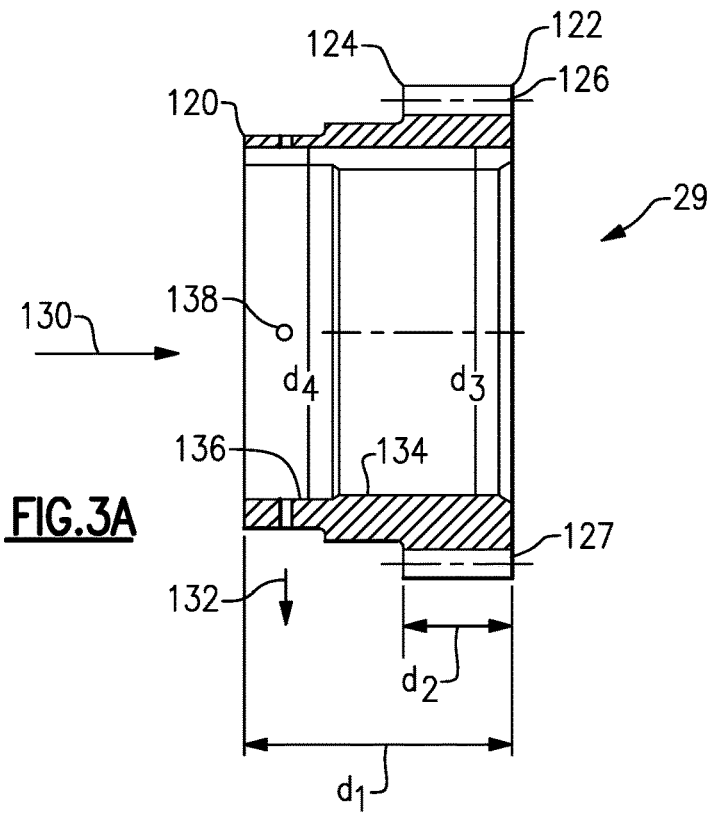
FIG. 3A shows an accessory drive gear in accordance with this disclosure.

Accessory drive gear 29 is illustrated in FIG. 3A. A gear body has gear teeth at an outer periphery 127. As shown, gear teeth 126 extend from a forward end 122 to a rear end 124. A rear end 120 of the overall gear 29 is spaced from end 122 by a first distance $d_1$ or an overall length. The distance between the gear teeth ends 122 and 124 is defined as a distance $d_2$ or a width. An inner diameter of an inner bore 134 is $d_3$.

As shown, an enlarged channel 136 is formed to be radially outward from the nominal inner bore surface of inner bore 134 more adjacent the rear end 120. Oil 130 is delivered into the inner bore of the accessory drive gear 29 and moves outwardly through oil outlet ports 138 in a wall of the channel 136 to cool the winding of the permanent magnet generator 32. In embodiments, there are two of the ports 138 spaced by 180 degrees. A distance to the inner surface at the channel is defined as $d_4$. In disclosed embodiments, $d_1$ was 1.071 inches (2.72 cm) and $d_2$ was 0.441 inch (1.12 cm).

In embodiments, $d_3$ is 1.29995 inches and $d_4$ is 1.330 inches. In a prior art accessory drive gear, $d_1$ was 0.8 inch (2.03 cm), $d_2$ was 0.346 inch (0.88 cm), $d_3$ was 1.187 inches (3.01 cm).

In embodiments, a ratio of $d_1$ to $d_2$ is between 2.35 and 2.5. A ratio of $d_3$ to $d_4$ is between 1.01 and 1.15.

Figure 3B:
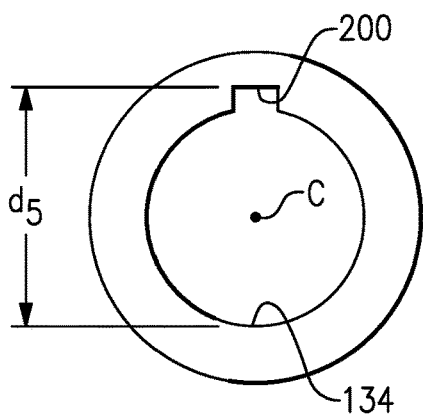
FIG. 3B is a cross-section.

FIG. 3B shows a cross-section of accessory drive gear 29. A keyway 200 is shown to secure the gear to a shaft. A distance $d_5$ is defined from a bottom surface of the keyway 200 to an opposed point on nominal inner bore 134. In embodiments, $d_5$ is 1.38 inches (3.51 cm), with a tolerance of 0.01 inch (0.03 cm).

Figure 4:
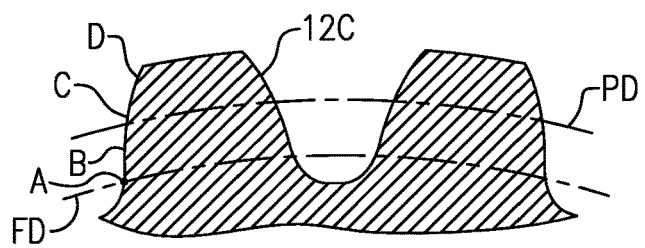
FIG. 4 shows gear teeth on a disclosed accessory drive gear.

FIG. 4 shows a gear tooth profile 126. As shown, a pitch diameter PD is defined. As is known in the gear tooth art, the profile of the gear tooth 126 is defined by roll angles at four points A, B, C, D. It should be understood specific roll angles of this disclosed accessory drive are novel. All that is known in the art is the specific location of the points A-D.

In a disclosed embodiment, the roll angle at A is 17.87 degrees, and in embodiments between 17.0 and 18.5°. The roll angle at B is 20.97 degrees and in embodiments, it is between 20.0 and 21.5°. The roll angle at C is 30.25 degrees and in embodiments, it is between 29.5 and 31.0°. The roll angle at D is 33.35 degrees and in embodiments, it is between 32.5 and 34.0°.

The roll angle A is applied at the form diameter FD. In this portion, the maximum form diameter is 1.75635. The roll angle B is 20% away from roll angle A, between roll angle A and roll angle D, and the roll angle C is 80% away from roll angle A, between roll angle A and roll angle D. The roll angle D is at the outer diameter of the gear tooth 126.

In embodiments, the diameter to the outer surface of the gear teeth 126 is 1.940 inches 4.93 cm). The pitch diameter is 1.85 inches (4.7 cm). A root diameter is 1.715 inches (4.36 cm). These are all with a tolerance of 0.1 inch (0.03 cm). There are 37 teeth.

A method of replacing an accessory drive gear includes the steps of removing an existing accessory drive gear from an integrated drive generator having an input shaft, a gear differential including a carrier shaft and the gear differential including a ring gear for driving a generator. The carrier shaft was connected to drive the existing accessory drive gear. The existing accessory drive gear drives at least one driven gear to, in turn, drive at least one pump.

The existing accessory drive gear is replaced with a replacement accessory drive gear including a gear body extending between a forward end and a rear end and having a plurality of gear teeth at a radially outer surface adjacent the forward end. The gear teeth have a gear tooth profile, with roll angles at A, B, C, and D. The roll angle at A is between 17.0 and 18.5°. The roll angle at B is between 20.0 and 21.5°. The roll angle at C is between 29.5 and 31.0°, and the roll angle at D is between 32.5 and 34.0°.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. An accessory drive gear for use in an integrated drive generator comprising:
   a gear body extending between a first end and a second end and having a plurality of gear teeth at a radially outer surface adjacent said first end, and said gear teeth having a gear tooth profile, with said gear teeth profiles defined by roll angles A, B, C, and D, and the roll angle at A being between 17.0 and 18.5°, the roll angle at B being between 20.0 and 21.5°, the roll angle at C being between 29.5 and 31.0°, and the roll angle at D being between 32.5 and 34.0°,
   wherein said gear teeth extend for a width away from said first end, and there being an overall axial length of said accessory drive gear from said first end to the second end, and a ratio of said overall axial length to said width of said gear teeth being between 2.35 and 2.5;
   wherein said gear body has an inner bore with a nominal inner bore surface extending from said first end toward said second end, an enlarged channel formed from said second end to meet said nominal inner bore surface, and oil outlet ports extending through a wall of said gear body within said channel; and
   wherein a ratio of a first inner diameter of said nominal inner bore surface to a second inner diameter of said enlarged channel is between 1.01 and 1.115.

2. The accessory drive gear as set forth in claim 1, wherein an outer diameter of said gear teeth is 1.94 inches (4.93 cm), a pitch diameter of said gear teeth is 1.85 inches (4.7 cm), and a root diameter of said gear teeth is 1.75 inches (4.45 cm), each with a tolerance of ±0.1 inch (0.25 cm).

3. An integrated drive generator system comprising:
   an input shaft, and a gear differential including a carrier shaft to be driven by said input shaft and a ring gear connected for driving a generator;
   said carrier shaft also connected to drive an accessory drive gear, said accessory drive gear connected to drive at least one driven gear to, in turn, drive at least one pump;
   said accessory drive gear including a gear body extending between a first end and a second end and having a plurality of gear teeth at a radially outer surface adjacent said first end, and said gear teeth having a gear tooth profile, with said gear teeth profiles defined by roll angles A, B, C, and D, and the roll angle at A being between 17.0 and 18.5°, the roll angle at B being between 20.0 and 21.5°, the roll angle at C being between 29.5 and 31.0°, and the roll angle at D being between 32.5 and 34.0°;
   wherein said gear teeth extend for a width away from said first end, and there being an overall axial length of said accessory drive gear from said first end to the second end, and a ratio of said overall axial length to said width of said gear teeth being between 2.35 and 2.5;
   wherein said gear body has an inner bore with a nominal inner bore surface extending from said first end toward said second end, an enlarged channel formed from said second end to meet said nominal inner bore surface, and oil outlet ports extending through a wall of said gear body within said channel; and wherein a ratio of an inner diameter of said nominal inner bore surface to an inner diameter of said channel is between 1.01 and 1.115.

4. The integrated drive generator system as set forth in claim 3, wherein an outer diameter of said gear teeth is 1.94 inches (4.93 cm), a pitch diameter of said gear teeth is 1.85 inches (4.7 cm), and a root diameter of said gear teeth is 1.75 inches (4.45 cm), each with a tolerance of ±0.1 inch (0.25 cm).

5. The integrated drive generator system as set forth in claim 3, wherein said at least one pump includes an inversion pump.

6. The integrated drive generator system as set forth in claim 5, wherein said at least one driven gear is one of two driven gears, with a first of said driven gears driving said inversion pump and a governor, and a second of said driven gears driving a deaerator.

7. A method of replacing an existing accessory drive gear comprising the steps of:
removing the existing accessory drive gear from an integrated drive generator having an input shaft, a gear differential including a carrier shaft and the gear differential including a ring gear for driving a generator;
wherein said carrier shaft is also connected for driving said existing accessory drive gear, said existing accessory drive gear is connected for driving at least one driven gear to, in turn, drive at least one pump;
replacing the existing accessory drive gear with a replacement accessory drive gear including a gear body extending between a first end and a second end and having a plurality of gear teeth at a radially outer surface adjacent said first end, and said gear teeth having a gear tooth profile, with said gear teeth profiles defined by roll angles at A, B, C, and D, and the roll angle at A being between 17.0 and 18.5°, the roll angle at B being between 20.0 and 21.5°, the roll angle at C being between 29.5 and 31.0°, and the roll angle at D being between 32.5 and 34.0°;
wherein said gear teeth extend for a width away from said first end, and there being an overall axial length of said accessory drive gear from said first end to the second end, and a ratio of said overall axial length to said width of said gear teeth being between 2.35 and 2.5;
wherein said gear body has an inner bore with a nominal inner bore surface extending from said first end toward said second end, an enlarged channel formed from said second end to meet said nominal inner bore surface, and oil outlet ports extending through a wall of said gear body within said channel; and
wherein a ratio of an inner diameter of said nominal inner bore surface to an inner diameter of said channel is between 1.01 and 1.115.

8. The method of replacing accessory drive gear as set forth in claim 7, wherein an outer diameter of said gear teeth is 1.94 inches (4.93 cm), a pitch diameter of said gear teeth is 1.85 inches (4.7 cm), and a root diameter of said gear teeth is 1.75 inches (4.45 cm), each with a tolerance of ±0.1 inch (0.25 cm).

* * * * *